United States Patent
Hsieh et al.

(10) Patent No.: US 10,051,336 B2
(45) Date of Patent: Aug. 14, 2018

(54) CONTROL CIRCUIT OF MULTIMEDIA DEVICE AND DATA PROCESSING METHOD THEREOF

(71) Applicant: MStar Semiconductor, Inc., Hsinchu Hsien (TW)

(72) Inventors: An-Chang Hsieh, Hsinchu Hsien (TW); Pei-Yu Chiang, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/236,837

(22) Filed: Aug. 15, 2016

(65) Prior Publication Data

US 2017/0325001 A1    Nov. 9, 2017

(30) Foreign Application Priority Data

May 5, 2016 (TW) .............................. 105113925 A

(51) Int. Cl.

| | | |
|---|---|---|
| H04N 21/439 | (2011.01) | |
| H04N 21/6336 | (2011.01) | |
| H04L 29/06 | (2006.01) | |
| H04N 21/433 | (2011.01) | |
| H04N 19/15 | (2014.01) | |
| H04N 5/073 | (2006.01) | |
| H04N 21/24 | (2011.01) | |
| H04N 21/44 | (2011.01) | |

(52) U.S. Cl.
CPC ....... *H04N 21/6336* (2013.01); *H04L 65/604* (2013.01); *H04L 65/607* (2013.01); *H04N 5/0736* (2013.01); *H04N 19/15* (2014.11); *H04N 21/2401* (2013.01); *H04N 21/4334* (2013.01); *H04N 21/4392* (2013.01); *H04N 21/44004* (2013.01)

(58) Field of Classification Search
CPC ..... H04N 5/0736; H04N 19/15; H04N 19/152
See application file for complete search history.

(56) References Cited

U.S. PATENT DOCUMENTS

| | | | | |
|---|---|---|---|---|
| 6,233,389 B1* | 5/2001 | Barton | ................. | G11B 27/002 |
| | | | | 348/E5.007 |
| 6,327,418 B1* | 12/2001 | Barton | ............. | H04N 21/47202 |
| | | | | 348/E5.007 |
| 6,628,719 B1* | 9/2003 | Kono | ................... | H04N 19/172 |
| | | | | 375/240.25 |
| 7,558,472 B2* | 7/2009 | Locket | ................... | H04N 5/775 |
| | | | | 386/326 |
| 8,380,041 B2* | 2/2013 | Barton | ................. | G11B 27/031 |
| | | | | 386/230 |
| 8,457,476 B2* | 6/2013 | Locket | ......................... | 386/330 |
| 8,577,205 B2* | 11/2013 | Barton | ................. | G11B 27/329 |
| | | | | 386/200 |

(Continued)

*Primary Examiner* — Nicholas T Corbo
(74) *Attorney, Agent, or Firm* — Edell, Shapiro & Finnan, LLC

(57) ABSTRACT

A data processing method of a multimedia device is disclosed. The multimedia device pauses playback of multimedia data in response to a pause signal. The method includes: buffering the multimedia data before the pause signal is received to obtain prerecorded multimedia data; writing the prerecorded multimedia data into a storage unit in response to the pause signal; reading the prerecorded multimedia data from the storage unit in response to a playback signal; and playing the prerecorded multimedia data.

10 Claims, 4 Drawing Sheets

(56) References Cited

U.S. PATENT DOCUMENTS

| | | | |
|---|---|---|---|
| 8,943,527 B2 * | 1/2015 | Ghashghai | H04H 60/31 |
| | | | 725/14 |
| 8,948,569 B2 * | 2/2015 | Barton | 386/235 |
| 9,032,456 B2 * | 5/2015 | Pierson | G11B 27/005 |
| | | | 725/101 |
| 9,363,564 B2 * | 6/2016 | Barton | G06Q 30/0241 |
| 2002/0163964 A1 * | 11/2002 | Nichols | H04N 21/4147 |
| | | | 375/240.03 |
| 2005/0262539 A1 * | 11/2005 | Barton | G11B 27/034 |
| | | | 725/90 |
| 2010/0046914 A1 | 2/2010 | O'Connor | |
| 2010/0066841 A1 * | 3/2010 | Quail | H04N 5/76 |
| | | | 348/207.11 |
| 2011/0075985 A1 | 3/2011 | Potrebic et al. | |
| 2013/0308927 A1 | 11/2013 | Demas et al. | |

\* cited by examiner

CONTROL CIRCUIT OF MULTIMEDIA DEVICE AND DATA PROCESSING METHOD THEREOF

This application claims the benefit of Taiwan application Serial No. 105113925, filed May 5, 2015, the subject matter of which is incorporated herein by reference.

BACKGROUND OF THE INVENTION

Field of the Invention

The invention relates in general to a multimedia device, and more particularly to a multimedia device with a timeshift function.

Description of the Related Art

A multimedia device (e.g., a player, a television or a set-top box) with a timeshift function provides a pause function, and allows a user to temporarily leave without missing brilliant program details. FIG. 1 shows a flowchart of a conventional multimedia playing multimedia data and performing a timeshift function. When the multimedia device receives a multimedia signal, it parses the multimedia signal to obtain multimedia data carried in the multimedia signal (step S110). For example, if the multimedia signal is transmitted in a format of a transport stream, this step removes various kinds of headers in the transport stream to leave multimedia data carrying video and audio information. Before a pause signal is received (the determination result of step S115 is negative), the multimedia data is directly parsed (step S120), and pre-playback processes are performed on the multimedia data (step S130) by the multimedia device, e.g., de-interlacing, scaling. The multimedia data is then played (step S140).

When the multimedia device receives the pause signal (the determination result of step S115 is affirmative), a control circuit of the multimedia device first pauses playing the multimedia data (step S150), starts writing the multimedia data to a multimedia buffer unit (step S160), and writes the multimedia data into a storage unit (step S170). In general, an access speed of a multimedia buffer unit is faster than that of a storage unit, with however the storage unit having a greater storage space. For example, the multimedia buffer unit is a volatile memory (e.g., a DRAM or SRAM), and the storage unit is a non-volatile memory (e.g., a flash, solid-state drive (SSD) or magnetic disk).

When playback is resumed (decoding, performing pre-playback processes and playing a multimedia file stored in a storage unit) after the conventional timeshift function, a black screen of a display device is often resulted. The reason is that, the multimedia device only starts storing current undecoded multimedia data after it receives the pause signal, while the image currently being played on the display device is an earlier image (previously decoded and having undergone pre-playback processes). Thus, there may be a difference of several frames in between (depending on the format of the multimedia data and the processing speed of the multimedia device). These "lost frames" are the main cause of the black screen observed during the timeshift function.

SUMMARY OF THE INVENTION

The invention is directed to a control method of a multimedia device and a data processing method thereof to improve user experiences in using the timeshift function.

The present invention discloses a data processing method for multimedia device. The multimedia device pauses playback of multimedia data in response to a pause signal. The method includes: buffering the multimedia data before the pause signal is received to obtain prerecorded multimedia data; writing the prerecorded multimedia data into a storage unit in response to the pause signal; reading the prerecorded multimedia data from the storage unit in response to a playback signal; and playing the prerecorded multimedia data.

The present invention further discloses a control circuit of a multimedia device. The multimedia device includes a multimedia buffer unit and a storage unit, and pauses playback of multimedia data in response to a pause signal. The control circuit includes: a transport stream processing unit, parsing a multimedia signal to generate the multimedia data; and a control unit, performing operations of: buffering the multimedia data to the multimedia buffer unit before the pause signal is received to obtain prerecorded multimedia data; writing the prerecorded multimedia data into the storage unit in response to the pause signal; reading the prerecorded multimedia data from the storage unit in response to a playback signal; and playing the prerecorded multimedia data.

The control method and the data processing method of the present invention are capable of prerecording the multimedia data before playback is paused, in a way that the subsequent resume operation may be seamlessly performed to enhance user experiences. Compared to a conventional technology, the control circuit and the data processing method of the present invention are capable of preventing the black screen.

The above and other aspects of the invention will become better understood with regard to the following detailed description of the preferred but non-limiting embodiments. The following description is made with reference to the accompanying drawings.

DETAILED DESCRIPTION OF THE INVENTION

This application discloses a control circuit of a multimedia device and a data processing method thereof capable of preventing a black screen to enhance user experiences. In possible implementation, one person skilled in the art can choose equivalent elements or steps to realize the present invention based on the disclosure of the application. That is, the implementation of the present invention is not limited to the non-limiting embodiments below.

Figure 1:
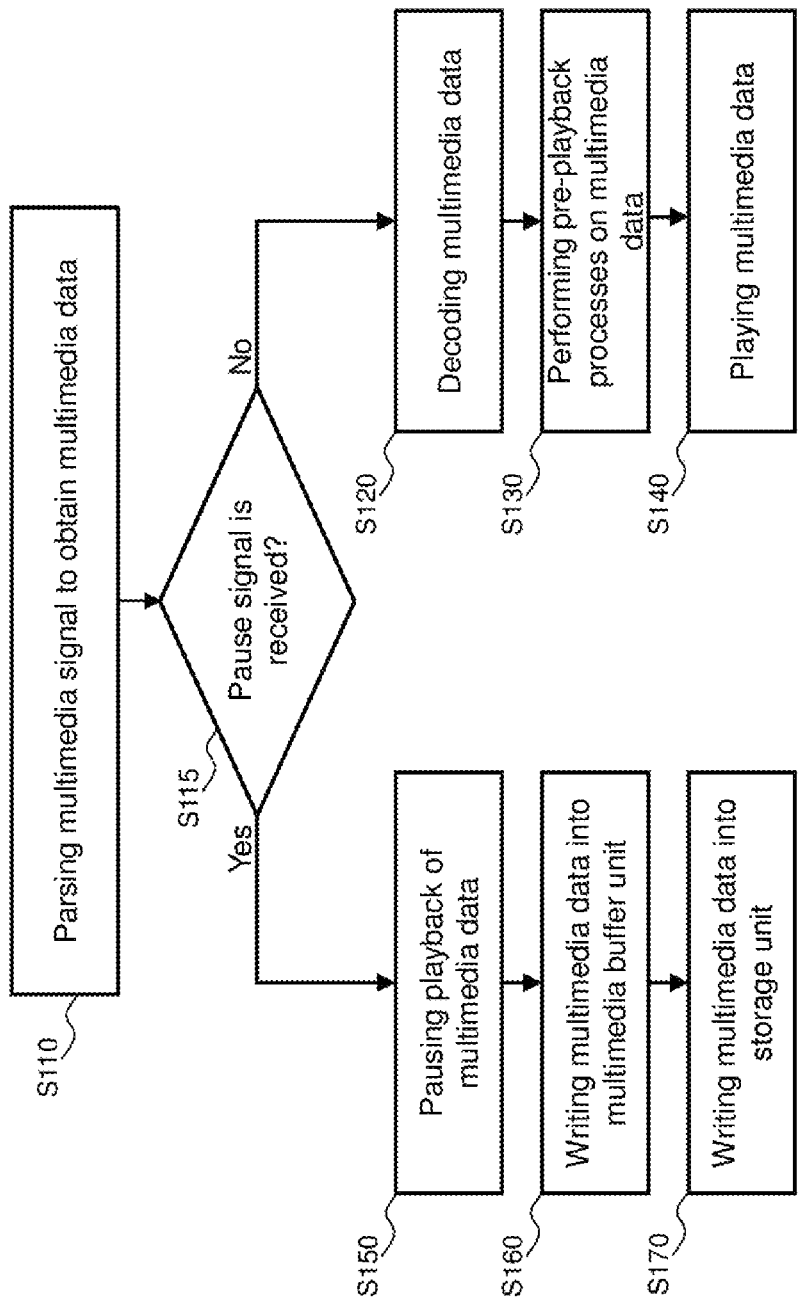
FIG. 1 is a flowchart of a conventional multimedia device playing multimedia data and performing a timeshift function.
Figure 2:
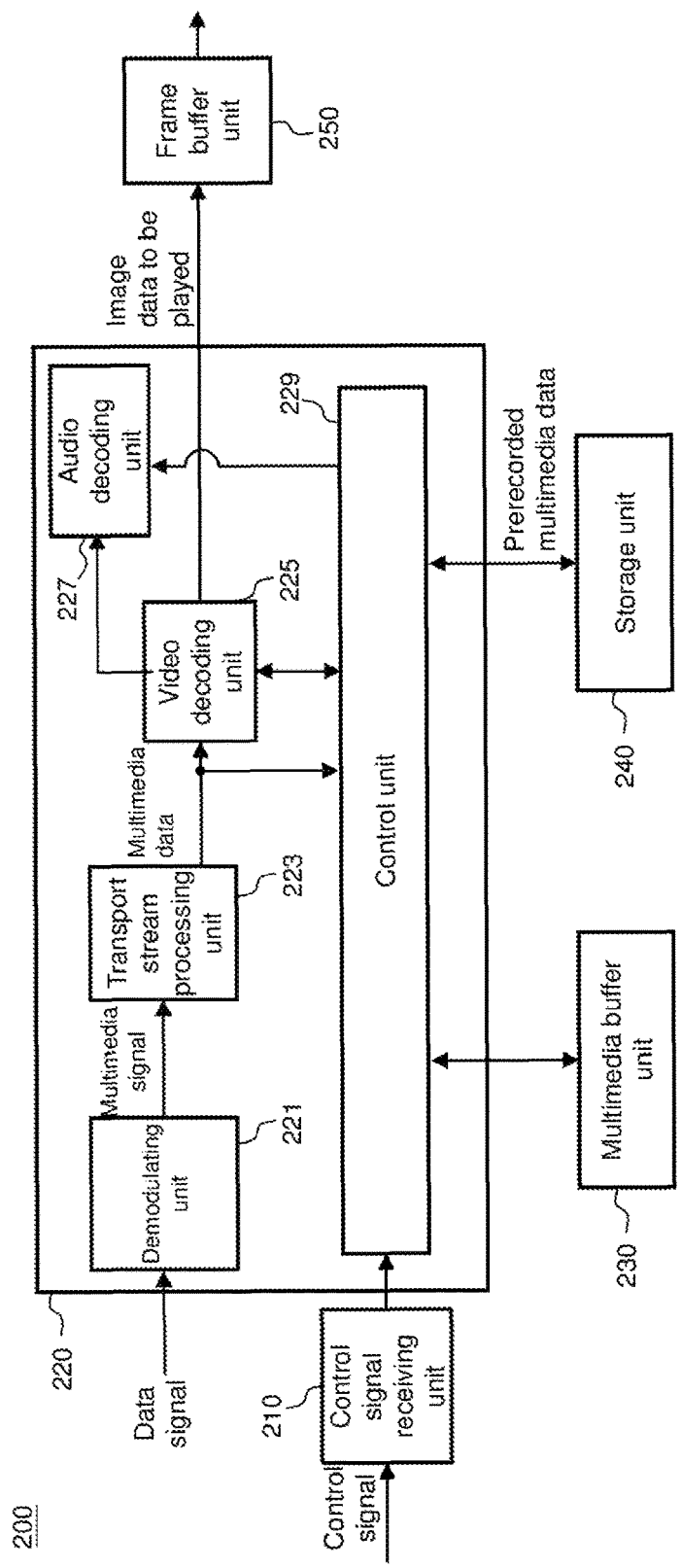
FIG. 2 is a function block diagram of a multimedia device according to an embodiment of the present invention.

FIG. 2 shows a function block diagram of a multimedia device according to an embodiment of the present invention. The multimedia device 200 includes a control signal receiving unit 210, a control circuit 220, a multimedia buffer unit 230, a storage unit 240, and a frame buffer unit 250. The control signal receiving unit 210 receives a control signal, e.g., a pause signal or a playback signal. The control circuit 220 processes a data signal to generate image data to be played. The image data to be played is buffered in the frame buffer unit 250 (e.g., implemented by a DRAM) before transmitted to and played by a display device (not shown). The multimedia buffer unit 230 and the storage unit 240 store rerecorded multimedia that the timeshift function generates. For example but not limited to, the multimedia buffer unit 230 may be implemented by a storage medium having a faster access speed (e.g., a volatile memory such as a DRAM or SRAM), and the storage unit 240 may be implemented by a storage medium having a greater storage capacity (e.g., a non-volatile memory such as a flash, SSD and magnetic disk). The control circuit 220 includes a demodulating unit 221, a transport stream processing unit 223, a video decoding unit 225, an audio decoding unit 227 and a control unit 229.

Figure 3:
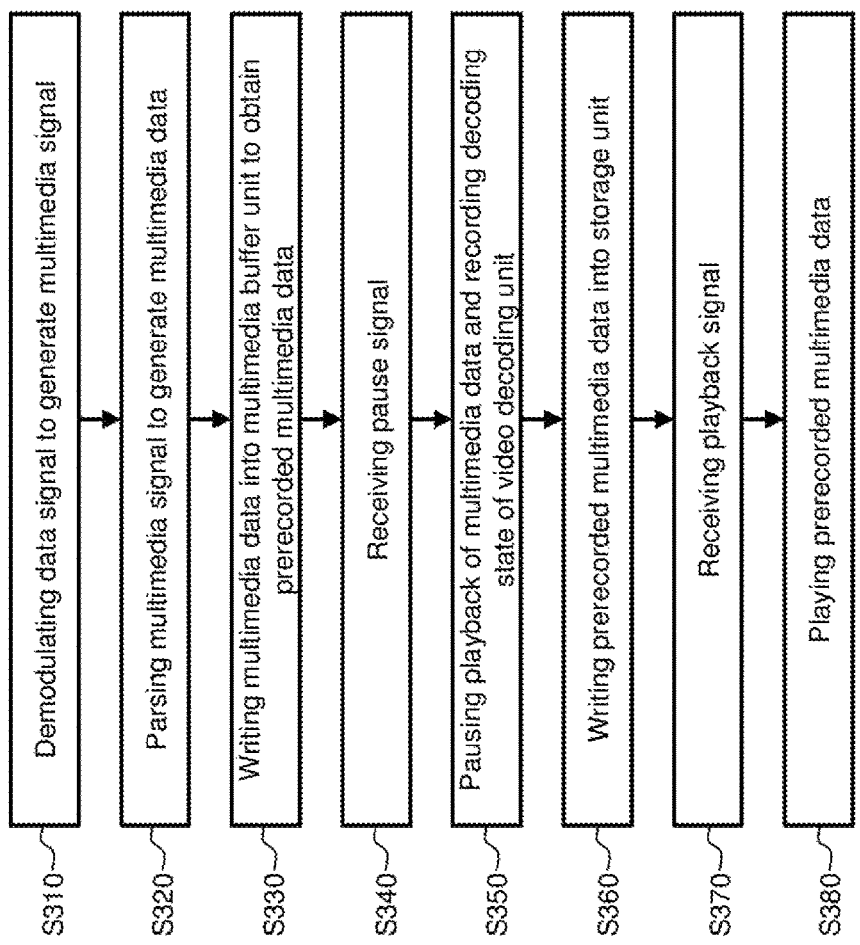
FIG. 3 is a flowchart of a data processing method according to an embodiment of the present invention.

Referring to FIG. 3 showing a flowchart of a data processing method of a multimedia device of the present invention, operation details of the multimedia device of the present invention are given as below. After the multimedia device 200 receives a data signal, the demodulating unit 221 demodulates the data signal to generate a multimedia signal (step S310). The transport stream processing unit 223 performs parsing processes such as removing the header on the multimedia signal in a transport stream format to generate multimedia data (step S320). The control unit 229 then writes the multimedia data into the multimedia buffer unit 230, and prerecorded multimedia data is obtained from the multimedia buffer unit 230 (step S330). Next, the control unit 229 receives a pause signal sent from the control signal receiving unit 210 (step S340), controls the video decoding unit 225 and the audio decoding unit 227 to suspend respective operations to cause the multimedia device 200 pause playback of the multimedia data (step S350), and writes the prerecorded multimedia data into the storage unit 240 (step S360). In step S350, while the control unit 229 controls the video decoding unit 225 to suspend operations of the video decoding unit 225, it further records a decoding state of the video decoding unit 225 at that time. This decoding state is a presentation timestamp (PTS) and group of pictures (POC) of the frame that the video decoding unit 225 is currently decoding. The decoding state of the video decoding unit 225 may be used as a basis for later determining whether seamless playback can be performed when the playback is subsequently resumed. By recording the frame that is currently being decoded, the decoding operation of the video decoding unit 225 in the subsequent playback process can be prevented from interference (with associated details to be given in the playback process). When the user later resumes watching, the control unit 229 receives the playback signal sent from the control signal receiving unit 210 (step S370), reads the prerecorded multimedia data from the storage unit 240, and transmits the multimedia data to the video decoding unit 225 and the audio decoding unit 227 to play the prerecorded multimedia data.

In the multimedia device and the data processing method according to embodiments of the present invention, since the multimedia data has already been stored before the pause signal is received, the multimedia data corresponding to the frame (to be referred to as a target frame) that the video decoding unit 225 is currently decoding at the time when the pause signal is received is in fact stored in advance (i.e., included in the abovementioned prerecorded multimedia data). Thus, when the prerecorded multimedia data is played in step S380, the playback may be resumed from the target frame, hence eliminating the issue of lost frames or black screen as in the conventional technology.

In step S330, if the multimedia buffer unit 230 is fully written, the newly generated multimedia data overwrites the oldest multimedia data. It should be noted that, in different embodiments, given the storage capacity of the multimedia buffer unit 230 is large enough, the storage unit 240 may be omitted from the multimedia device 200, and the prerecorded multimedia data may be entirely stored in the multimedia buffer unit 230. When the playback is later resumed, the control unit 229 reads the prerecorded multimedia data from the multimedia buffer unit 230. In the above scenario, step S360 may be correspondingly omitted.

Figure 4:
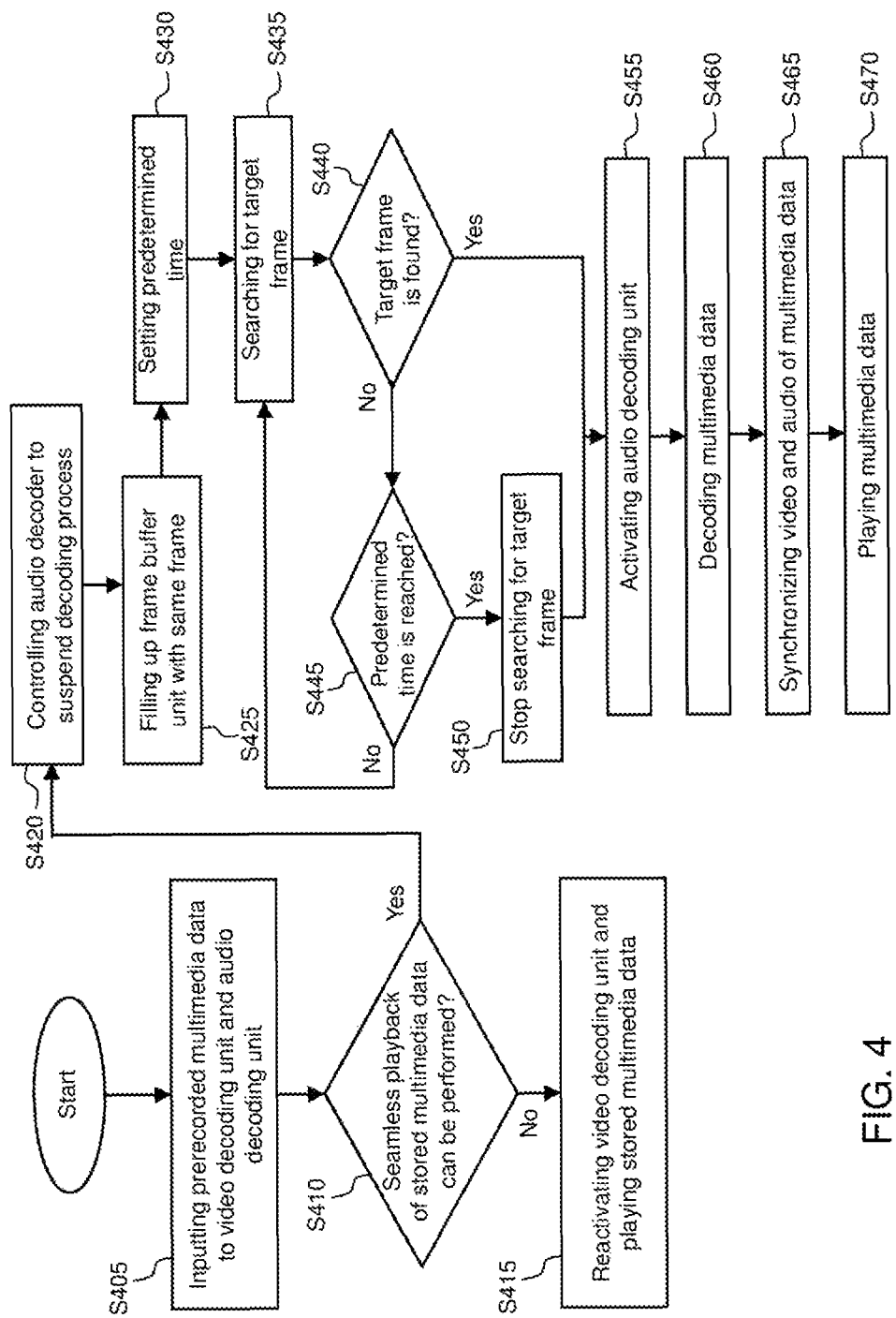
FIG. 4 is a process of a multimedia device performing playback of prerecorded multimedia data according an embodiment of the present invention.

FIG. 4 shows an operation process of a multimedia device performing playback of prerecorded multimedia data according to an embodiment of the present invention, i.e., the detailed process of step S380 in FIG. 3. After receiving the playback signal, the control unit 229 reads the prerecorded multimedia data from the storage unit 240, transmits the prerecorded multimedia data to the video decoding unit 225 and the audio decoding unit 227 (step S405), and controls the video decoding unit 225 to suspend receiving the multimedia data that the transport stream processing unit 223 outputs. The control unit 229 then determines whether seamless playback can be performed according to the decoding state of the video decoding unit 225 recorded in step S350 (step S410). More specifically, in step S410, the control unit 229 determines whether there are records of PTS and POC of the target frame. The PTS and POC are the basis for the video decoding unit 225 to later search for the target frame. Thus, if the PTS and POC are not successfully recorded in step S350, it means that the target frame cannot be identified from the prerecorded multimedia data, nor can seamless playback be performed. If seamless playback cannot be performed, the video decoding unit 225 is reactivated, and the video decoding unit 225 and the audio decoding unit 227 are caused to decode the prerecorded multimedia data in order to play the prerecorded multimedia data (step S415). Conversely, if the control unit 229 determines in step S415 that seamless playback can be performed, the control unit 229 controls the audio decoding unit 227 to suspend the decoding process (step S420), and the video decoding unit 225 decodes the prerecorded multimedia data. To prevent the decoding operation of the video decoding unit 225 from interference, the control unit 229 writes a previous frame (still stored in the buffer unit of the video decoding unit 225 or may be obtained from the prerecorded multimedia data) of the frame that the video decoding unit 225 is currently decoding, as previously recorded in step S350, to fill up the entire frame buffer unit 250 (step S425), and determines a predetermined time according to the data amount and format of the prerecorded multimedia data (step S430). This predetermined time is for the video decoding unit 225 to search for the target frame from the prerecorded multimedia data. Because the video decoding unit 225 needs to decode the prerecorded multimedia data, if the amount of the multimedia data is large or each frame includes a larger amount of pixel data, the time need for the video decoding unit 225 to search for the target frame is inevitably longer. In general, when the multimedia device 200 receive the pause signal, the data amount between the multimedia data that the video decoding unit 225 is currently decoding and the target frame is approximately a playback period of 1 second. Therefore, based on the data format of a highest resolution (i.e., the longest time period that the video decoding unit 225 needs to decode one frame) and the decoding capability of the decoding unit 225, the control unit 229 may estimate the maximum value of the search time. If the video decoding unit 225 searches beyond this search time, the control unit 229 determines that the target frame cannot be found from the prerecorded multimedia data.

Next, the control unit 229 controls the video decoding unit 225 to search the prerecorded multimedia for the target frame (step S435). The video decoding unit 225 searches for the target frame according to a decoding order of the frames, and the decoding order may be learned from the PTS or POC of the frames. In steps S440, S445 and S450, the control unit 229 continues monitoring whether the video decoding unit 225 finds the target frame within the predetermined time. More specifically, the video decoding unit 225 decodes the prerecorded multimedia data, and the target frame is found if the PTS and POC or the decoded frame are identical to the PTS and POC recorded in step S350. When the video decoding unit 225 finds the target frame within the predetermined time (when the determination result of step S440 is affirmative), the video decoding unit 225 sends a signal to notify the control unit 229, which then controls the audio decoding unit 227 to reactivate (step S455), and controls the video decoding unit 225 and the audio decoding unit 227 to discard the multimedia data earlier than the target frame and start decoding the multimedia data from the target frame as the starting point (step S460). When the multimedia data that has been decoded achieves video and audio synchronization (step S465), the multimedia data can then be played (step S470).

On the other hand, if the video decoding unit 225 fails to find the target frame within the predetermined time (the determination result of step S445 is negative), the control unit 229 controls the video decoding unit to stop searching for the target frame (step S450), followed by similarly performing steps S455 to S470. However, playback cannot be resumed in continuation from the target frame. Even though seamless playback cannot be achieved, having already stored in advance the multimedia data before the pause signal is received, the present invention still provides preferred user experiences as opposed to conventional technologies.

For example, the data signal may be various types of live stream signals, e.g., live digital television signals, live analog television signals and Internet live signals.

One person skilled in the art can understand implementation details and variations of the method of the present invention in FIG. 3 and FIG. 4 based on the disclosure of the device of the present invention in FIG. 2. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing method of a multimedia device, the multimedia device pausing playback of multimedia data in response to a pause signal, the method comprising:
    buffering the multimedia data before the pause signal is received to obtain prerecorded multimedia data;
    writing the prerecorded multimedia data into a storage unit in response to the pause signal;
    reading the prerecorded multimedia data from the storage unit in response to a playback signal; and
    playing the prerecorded multimedia data, including:
        searching the prerecorded multimedia data for a target frame according to a decoding order of the multimedia data; and
        playing the prerecorded multimedia data from the target frame as a starting point,
    wherein the multimedia device comprises a video decoder that searches for the target frame, the method further comprising:
    recording a decoding state of the video decoder in response to the pause signal;
    wherein the step of playing the prerecorded multimedia data further comprises:
    determining whether to reactivate the video decoder according to the decoding state.

2. The method according to claim 1, wherein the target frame is a frame that is currently being decoded when the multimedia device receives the pause signal.

3. The method according to claim 1, wherein the step of playing the prerecorded multimedia data further comprises:
    when it is determined not to reactivate the video decoder in the step of determining whether to reactivate the video decoder according to the decoding state, determining a search time according to a data amount and format of the prerecorded multimedia data; and
    when the video decoder does not find the target frame after the search time ends, controlling the video decoder to stop searching for the target frame and decoding the prerecorded multimedia data.

4. The method according to claim 1, wherein the multimedia device further comprises an audio decoder, and the step of playing the prerecorded multimedia data further comprises:
    when it is determined not to reactivate the video decoder in the step of determining whether to reactivate the video decoder according to the decoding state, controlling the audio decoder to suspend a decoding process; and
    when the video decoder finds the target frame, controlling the audio decoder to decode the prerecorded multimedia data.

5. The method according to claim 1, the multimedia device comprising a video decoder and a frame buffer unit, the method further comprising:
    writing a previous frame of a frame currently being decoded into the frame buffer unit in response to the pause signal;
    wherein, the frame currently being decoded is a frame that the video decoder is currently decoding when the multimedia device receives the pause signal.

6. A control circuit of a multimedia device, the multimedia device pausing playback of multimedia data in response to a pause signal, the control circuit comprising:
    a transport stream processing unit, parsing a multimedia signal to generate the multimedia data; and
    a control unit, performing operations of:
    buffering the multimedia data before the pause signal is received to obtain prerecorded multimedia data;
    writing the prerecorded multimedia data into a storage unit in response to the pause signal;
    reading the prerecorded multimedia data from the storage unit in response to a playback signal; and
    playing the prerecorded multimedia data;
    the control circuit further comprising:
    a video decoder, coupled to the transport stream processing unit;
    wherein the control unit further performs operations of:

searching the prerecorded multimedia data for a target frame according to a decoding order of the multimedia data;

playing the prerecorded multimedia data from the target frame as a starting point;

recording a decoding state of the video decoder in response to the pause signal; and determining whether to reactivate the video decoder according to the decoding state when the prerecorded multimedia data is played.

7. The control circuit according to claim 6, wherein the target frame is a frame that is currently being decoded when the multimedia device receives the pause signal.

8. The control circuit according to claim 6, wherein the control unit further performs operations of:

when it is determined not to reactivate the video decoder, determining a search time according to a data amount and format of the prerecorded multimedia data; and when the video decoder does not find the target frame after the search time ends, controlling the video decoder to stop searching for the target frame and decoding the prerecorded multimedia data.

9. The control circuit according to claim 6, further comprising:

an audio decoder, coupled to the video decoder;

wherein, the control unit further comprises operations of:

when it is determined not to reactivate the video decoder, controlling the audio decoder to suspend a decoding process; and when the video decoder finds the target frame, controlling the audio decoder to decode the prerecorded multimedia data.

10. The control circuit according to claim 6, wherein the multimedia device further comprises a frame buffer unit that stores image data to be played, and the control circuit further comprises:

a video decoder; and the control unit further performs operations of:

writing a previous frame of a frame currently being decoded into the frame buffer unit in response to the pause signal;

wherein, the frame currently being decoded is a frame that the video decoder is currently decoding when the multimedia device receives the pause signal.

* * * * *